March 21, 1972  E. C. McKAY  3,651,197

METHOD FOR FABRICATING ELBOW GORES

Filed April 20, 1970

INVENTOR.
EDWIN C. McKAY

BY
Christie, Parker & Hale
ATTORNEYS

United States Patent Office 3,651,197
Patented Mar. 21, 1972

3,651,197
METHOD FOR FABRICATING ELBOW GORES
Edwin C. McKay, Fresno, Calif., assignor to Climate Conditioning Corporation, Stanton, Calif.
Filed Apr. 20, 1970, Ser. No. 29,950
Int. Cl. B29c 25/00
U.S. Cl. 264—230                                    7 Claims

ABSTRACT OF THE DISCLOSURE

A method for making elbow segments or gores of thermoplastic pipe such as polyvinyl chloride employs heat shrinking of extruded pipe onto a mold. A short length of pipe is heated, turned inside out, placed on the mold and shrunk in place with the aid of a cable tightened around the midsection of the gore on the inside of the elbow bend. Because the pipe section is turned inside out before shrinking, the elbow gore has cylindrical ends free of flaring.

BACKGROUND

In large-scale irrigation systems, water in large volumes is conveyed at relatively low pressures. For many years it has been a practice to convey water in concrete pipes; however, in recent years it has been found that it is more convenient and economical in many circumstances to employ plastic pipe such as polyvinyl chloride (PVC). This plastic irrigation pipe is commonly used in size ranges from 6 to 18 inches and, in some circumstances, larger and smaller diameters. The PVC pipe is lightweight, somewhat flexible and does not deteriorate in use, and hence has become widely accepted for irrigation.

Plastic irrigation pipe is commonly employed in long lengths with various conventional style plastic fittings preferably solvent welded in place. This technique commonly employs a fitting such as a coupling, tee, or the like, having an inside diameter only slightly larger than the outside diameter of the pipe. The fitting is placed over the end of the pipe and the interface between the pipe and fitting contains a cement including a solvent for the plastic material forming the pipe and the fitting. This solvent dissolves a portion of the plastic and forms a tight "weld" between the two pieces capable of withstanding the contained pressure within the pipe without leaking.

The plastic pipe is quite inexpensive since it is extruded in great lengths and is therefore quite cheap to manufacture. Fittings suitable for use with the plastic pipe are, however, more expensive since they are individually made. Individual fittings can be made by closed mold forming and this is commonly done for small size fittings; however, such a fabrication technique is prohibitively expensive for large diameter plastic irrigation pipe. It is preferably to form the pipe fittings from short sections of extruded pipe.

The properties of the PVC and other available thermoplastic materials are well suited to fabrication of fittings from sections of pipe. These materials have a property known as elastic or shape memory which manifests itself in the following manner: A plastic article is originally formed such as, for example, by extrusion to a particular size and shape. If it is thereafter heated to softening and deformed it "remembers" its original shape and tends to return to that shape even though nominally thermoplastic. The property of shape memory is employed, for example, to make pipe couplings or bell ends on pipes. In order to do this the pipe is heated and stretched slightly to fit over a mold having an outside diameter larger than the original diameter of the pipe by an amount corresponding to the wall thickness. The heated pipe tends to return to its original size and thereby fits tightly on the mold so that after cooling it has a suitable inside diameter to fit over an end of extruded pipe.

Attempts to make elbows and like fittings by relying on the shape memory of the plastic have not been entirely satisfactory since the fittings so formed tend to flare outwardly at the ends and do not fit sufficiently closely for solvent welding. Some elbow gores have been made in very short lengths and heat shrunk in the field to fit the plastic irrigation pipe; however, this is not entirely satisfactory since solvent welding is a much preferable technique to heat welding for field use.

BRIEF SUMMARY OF THE INVENTION

Thus in practice of this invention according to a preferred embodiment there is provided a method for fabricating elbow gores of thermoplastic material having shape memory, including the step of turning a cylinder of thermoplastic material completely inside out so that what was the outside surface is the inside surface, prior to forming the cylinder into an elbow gore.

DRAWINGS

These and other features and advantages of the present invention will be appreciated as the same becomes better understood by reference to the following detailed description of a presently preferred embodiment when considered in connection with the accompanying drawings wherein.

Throughout the drawings like numerals refer to like parts.

DESCRIPTION

Figure 1:
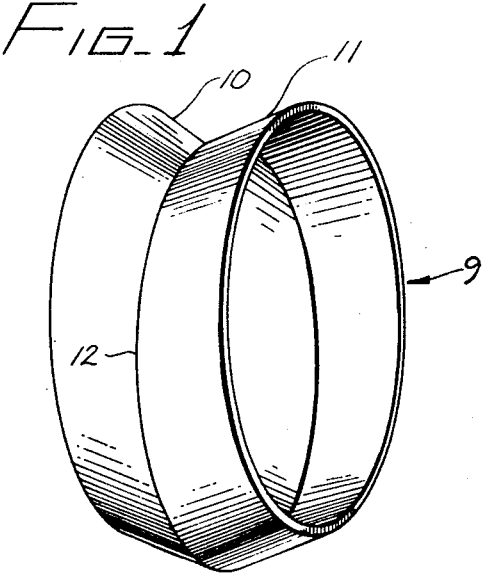
FIG. 1 illustrates in perspective an elbow gore constructed according to principles of this invention.

FIG. 1 illustrates an elbow gore 9 constructed according to principles of this invention. This gore is a 45° elbow permitting a change in direction of a pipe line of 45°. In order to make a turn of 90°, two such elbow gores are employed. It is also convenient to make elbow gores having an angle of 30° so that turns of 30 and 60° are also readily available. The same general technique is employed for making either 30° or 45° elbow gores.

The elbow gore 9 illustrated in FIG. 1 comprises a first diagonal section 10 of a cylinder intersecting a second cylindrical section 11 along a line 12. The intersection between the two diagonal cylindrical sections 10 and 11 is in a plane 22½° from the axes of each of the two cylinders so that the cylinder axes are at 45°. The intersection 12, therefore, describes an ellipse in the plane of intersection. The two open ends of the gore are parallel to the plane of intersection and are, therefore, elliptical in shape.

The elbow gore has an inside diameter equal to the outside diameter of the plastic pipe with which it is to be used, plus a small clearance to accommodate the solvent cement and permit field assembly. The length of each half of the elbow gore is approximately ¼ the diameter of the pipe with which the gore is to be used, that is, the total length of the elbow gore is approximately ½ the pipe diameter. In order to use the gore to make a pipe bend, the ends of two pieces of pipe are mitered at about 45° with a handsaw or the like, and after painting with a suitable solvent cement are inserted into the elbow gore to make a firm, leak-tight joint.

Figure 2:
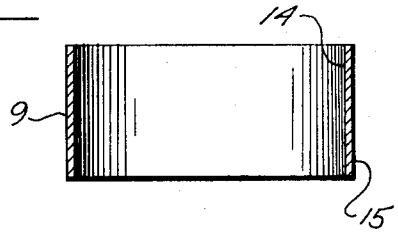
FIG. 2 illustrates in cross section a short cylinder of plastic pipe.

The first step in fabricating a gore, such as illustrated in FIG. 1, is to cut a length of plastic tube from a piece of extruded plastic irrigation pipe such as PVC to obtain a segment 9 as illustrated in FIG. 2. This is cut so that the length of the cylinder is ½ the pipe diameter. Thus, for example, if a gore is to be made for 8-inch plastic pipe, a 4-inch section of 8-inch extruded pipe is cut. This cylinder of pipe has an inside surface 14 and an outside surface 15 as it is cut from the length of plastic irrigation pipe.

Figure 3:
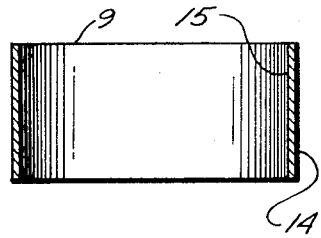
FIG. 3 illustrates the cylinder of FIG. 2 turned inside out.

The next step in the forming process is to heat the short cylinder 9 to a temperature in the range of about 300 to 325° F., preferably by immersion in an oil bath or the like. This softens the plastic to the point that it is deformable by hand, and the heated plastic pipe is gripped by hand with insulated gloves and turned completely inside out so that the original inside surface 14 is now on the outside and the original outside surface 15 is now on the inside as illustrated in FIG. 3. This turning inside out is readily accomplished by hand with plastic irrigation pipe softened by heating since the material behaves somewhat like a large "rubber band." Typically, 6-inch plastic irrigation pipe has a wall thickness of about 0.065 inch, and 15-inch plastic irrigation pipe has a wall thickness of about 0.250 inch. When softened, these pipe sizes are readily deformed by hand. If it is desired to form elbow gores of larger diameter pipe having greater wall thicknesses, supplementary mechanisms to provide sufficient force for turning the pipe wong side out may be required.

Figure 4:
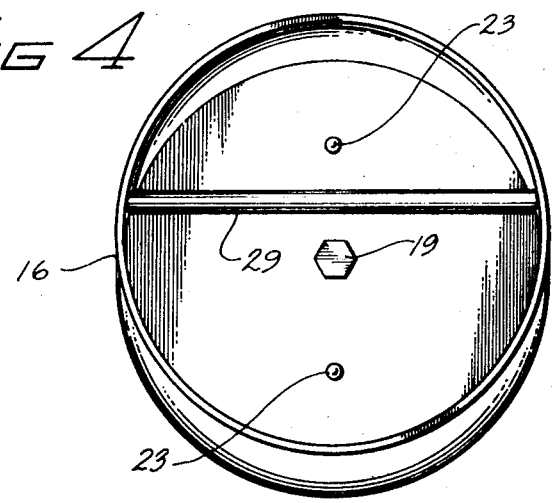
FIG. 4 illustrates in end view a gore mold for an elbow gore.
Figure 5:
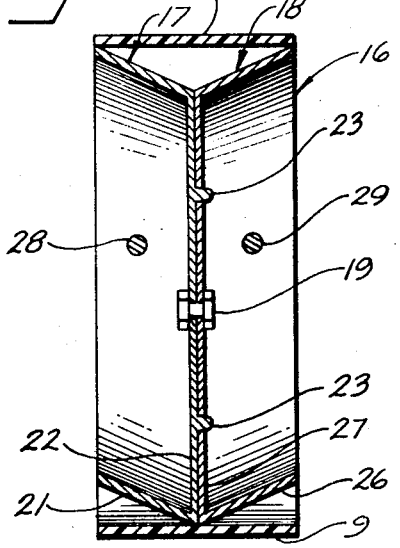
FIG. 5 illustrates in cross section the gore mold with a cylinder of plastic pipe thereon.

At the time that the pipe is turned inside out, its diameter is also stretched by hand so that it fits over a gore mold 16, such as illustrated in FIGS. 4 and 5, having an outside shape corresponding to the desired inside shape of the finished elbow gore. The 45° elbow gore mold 16 is in the form of two similar halves 17 and 18 fastened together by a bolt 19 for use. The mold half 17 has a diagonal cylindrical wall 21 open at one end and closed at the other end by a flat bottom wall 22. A pair of alignment studs 23 protrude from the bottom wall 22 for alignment with corresponding holes in the other mold half. The bottom wall 22 is at an angle of 24° from the axis of the cylindrical wall 21, and the open end of the mold half is also at an angle of 24° to the axis of the cylinder. The other mold half 18 is similar with a cylindrical wall 26 open at one end and closed at the other end by a flat bottom wall 27, which in use is fastened to the bottom wall 22 of the other mold half 17. The axis of the cylindrical wall 26 is at an angle of 24° to the plane of the bottom wall 27 so that the axes of the cylinders forming the two mold halves are at an angle of 48°. A transverse handle 28 is provided in the first mold half 17 and a similar transverse handle 29 is provided in the second mold half 18.

Figure 6:
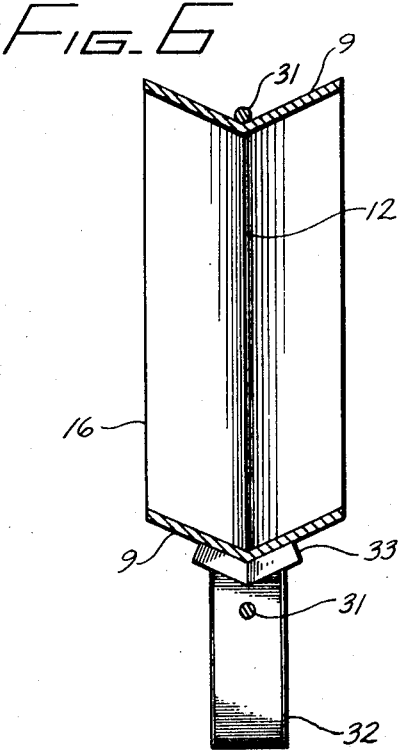
FIG. 6 illustrates the elbow gore shrunk onto the gore mold.

FIG. 5 shows the heat softened and stretched plastic cylinder 9 in position over the gore mold 16. It will be recognized, of course, that the illustrated cylindrical form of the plastic cylinder is somewhat idealized in this view since in practice it is somewhat shrunken and partially conforms to the shape of the gore mold. In order to bring the heat softened plastic cylinder into engagement with the external surface of the gore mold on the inside of the bend, a flexible cable 31 is passed around the cylinder and connected to a conventional tightening tool 32 mounted on a small "saddle" 33 that fits against the outside of the elbow gore bend as seen in FIG. 6. The cable 31 is tightened so as to bring the plastic cylinder into engagement with the outside of the gore mold throughout its extent to produce the final desired shape. The tightening tool 32 can be any of a number of tightening mechanisms or can be manual; however, it has been found convenient to empoly a conventional ratchet-type tightener such as employed for placing flat bands on packages modified only to permit grasping of the cable 31 instead of a flat band. Other similar mechanisms can, of course, be employed, but this has been found to provide very quick tightening for high productivity.

After the cable is tightened on the heated plastic over the gore mold, the entire assembly is cooled, preferably by immersing it in cold water, which causes the plastic to rigidify and become fixed in its final shape as an elbow gore. At this time, the tightener 32 and cable 31 are removed, the two mold halves 17 and 18 are unbolted and pulled out of the fabricated elbow gore. No additional processing of the elbow gore is required.

As mentioned hereinabove, the angle of the gore mold is about 48° which has been found to be the optimum angle for producing a 45° elbow gore. The cooled plastic apparently has a small amount of elastic spring-back when the gore mold is removed and the additional 3° angle results in an elbow gore having exactly a 45° angle. In a similar manner in order to produce a 30° elbow gore, a gore mold having an angle of about 33° between the axes of the gore halves is employed to provide for the elastic springback of the cooled PVC.

The entire process of making an elbow gore from the time that a cylinder of pipe is cut off until the finished gore is removed from the mold, it is in the order of only about 1½ minutes, which indicates that a high productivity can be obtained by this method. Since the process is conducted rapidly, the turning inside out, stretching and tightening on the gore mold can often be conducted from a single heating of the plastic. However, it will be apparent that if the plastic has unduly cooled, an intermediate reheating can be employed.

It has been found that if an elbow gore is fabricated by merely stretching a cylinder of plastic pipe and placing the same on a gore mold as described, that the ends of the resultant gore flare outwardly somewhat so that a tight fit to a length of plastic irrigation pipe is not obtained. Surprisingly, by merely turning the original short segment of plastic pipe completely inside out before placing on the gore mold, this difficulty is completely eliminated and a tight fit to the gore mold is obtained. In fabricating such an elbow gore, the plastic pipe is stretched about 7½% from its original circumference to the circumference at the open elliptical end. The restoring force due to the shape memory of the plastic pipe is apparently not sufficient to prevent flaring in the absence of the step of turning the plastic pipe inside out. It is believed that the step of turning the plastic pipe inside out substantially increases the shape memory and tendency of the material to return to its original size, thereby assuring a tight fit on the gore mold and a complete absence of flaring in the elbow gore.

A process for making elbow gores of plastic material having a shape memory has been provided and many modifications and variations of the process will be apparent to one skilled in the art. It is, therefore, to be understood that within the scope of the appended claims the invention may be practiced otherwise than as specifically described.

What is claimed is:

1. A method of fabricating an elbow gore of thermoplastic material having a shape memory comprising the steps of:
   heating a cylindrical length of thermoplastic tubing to its softening temperature;
   turning the cylinder completely inside out so that what was the outside surface is the inside surface; and
   forming the cylinder by heat shrinking the cylinder onto a mold in the form of two cylinders intersecting at an angle approximately the same as the angle of the desired elbow gore.

2. A method as defined in claim 1 wherein the step of forming includes:
   tightening a cable around the inside of the elbow gore bend.

3. A method as defined in claim 1 wherein the diameter of the initial cylindrical length of tubing is approximately the same as the diameter of the angled mold cylinders; and further comprising the step of stretching the cylindrical length of tubing to fit over the mold prior to the forming step.

4. A method as defined in claim 3 wherein the angle between the two mold cylinders is about 3° greater than the angle of the desired elbow gore.

5. In a method of fabricating a pipe fitting from a short length of thermoplastic pipe having shape memory wherein the pipe is heated to its softening temperature and shrunk onto a mold in the form of two cylinders intersecting at an angle, an improvement comprising the step of:

turning the length of heated pipe completely inside out so that what was the outside surface is the inside surface prior to shrinking onto the mold.

6. A method for fabricating an elbow gore of thermoplastic material having shape memory comprising:

cutting a cylindrical length of plastic tubing having a diameter substantially the same as the diameter of the desired elbow gore, the length of the cylinder being approximately ½ its diameter;

heating the cylinder into its softening range;

turning the cylinder completely inside out so that what was the outside surface is the inside surface;

stretching the cylinder sufficiently to fit over a gore mold in the form of a pair of cylindrical portions intersecting at an angle approximately that of the desired elbow gore;

tightening a cable over the outside of the palstic cylinder against the inside bend of the gore mold; and cooling the plastic to fix its shape to that of the gore mold.

7. A method as defined in claim 6 wherein the angle of intersection between the cylindrical portions of the gore mold is 3° greater than the angle of the desired elbow gore.

References Cited
UNITED STATES PATENTS

| 2,142,150 | 1/1939 | Replogle | 264—342 |
| 2,396,635 | 3/1946 | Bogoslowsky | 264—230 |
| 3,251,914 | 5/1966 | Kesling | 264—224 |
| 3,347,970 | 10/1967 | Hanna | 264—230 |

ROBERT F. WHITE, Primary Examiner

G. AUVILLE, Assistant Examiner

U.S. Cl. X.R.

264—249, 294, 322, 342, DIG 66, DIG 71